Nov. 1, 1955     A. T. BROCK     2,722,019
BUOY

Filed Feb. 25, 1952     6 Sheets-Sheet 1

FIG. I.

INVENTOR
AARON T. BROCK

BY
ATTORNEYS

Nov. 1, 1955 A. T. BROCK 2,722,019
BUOY
Filed Feb. 25, 1952 6 Sheets-Sheet 2

INVENTOR
AARON T. BROCK
BY George Sipkin
B. L. Zangwill
ATTORNEYS

Nov. 1, 1955 A. T. BROCK 2,722,019
BUOY
Filed Feb. 25, 1952 6 Sheets-Sheet 4

INVENTOR
AARON T. BROCK
BY George Sipkin
B. L. Tomgarll
ATTORNEYS

Nov. 1, 1955 A. T. BROCK 2,722,019
BUOY
Filed Feb. 25, 1952 6 Sheets-Sheet 6

INVENTOR
AARON T. BROCK

BY George Lipkin
B. L. Zangwill
ATTORNEYS

United States Patent Office 2,722,019
Patented Nov. 1, 1955

2,722,019

BUOY

Aaron T. Brock, Los Angeles, Calif.

Application February 25, 1952, Serial No. 273,321

6 Claims. (Cl. 9—8.3)

(Granted under Title 35, U. S. Code (1952), sec. 266)

The invention described herein may be manufactured and used by or for the Government of the United States of America for governmental purposes without the payment of any royalties thereon or therefor.

This invention relates to buoys, and more particularly to submersible buoys having adjustable means for causing a buoy to surface automatically after a predetermined period of submersion.

Generally, buoys are used for marking navigable channels in bodies of water or for marking various underwater hazards. It is desirable, under certain circumstances, to mark a navigable channel in a body of water with buoys which remain submerged so that the location of the channel may not be determined from the surface of the water, and then have all the buoys automatically rise to the surface and mark the channel at the expiration of a predetermined time. In this way, the exact location of the channel is not disclosed until the buoys rise to surface. Various types of buoys have been developed that are capable of being submerged or surfaced by the operation of remote control means. However, no buoy has been developed prior to the present invention that is capable of remaining submerged in a body of water for a predetermined period of time and thereafter automatically rising to the surface to mark a channel position in said body of water.

An object of the invention is to provide new and improved buoys.

Another object of the invention is a new and improved submersible buoy having self contained adjustable means for causing the buoy to surface automatically after a predetermined period of submersion.

A further object of the invention is the provision of submersible buoys having cable payout means designed to hold the buoy in a given location in a body of water and to payout additional cable as the depth of the water increases.

A buoy embodying certain features of the invention may include a buoyant chamber, means attached releasably to the chamber for submerging it below the surface of a body of water in which the buoy is to be used, means for releasing the chamber from the submerging means at the expiration of a predetermined period of time so that the chamber may rise to the surface of the water, and means secured on the chamber for providing visual indication of the position of the buoy in said body of water.

Other objects and advantages of the invention will appear from the following detailed description of a specific embodiment thereof when read in conjunction with the appended drawings in which.

Figure 1:
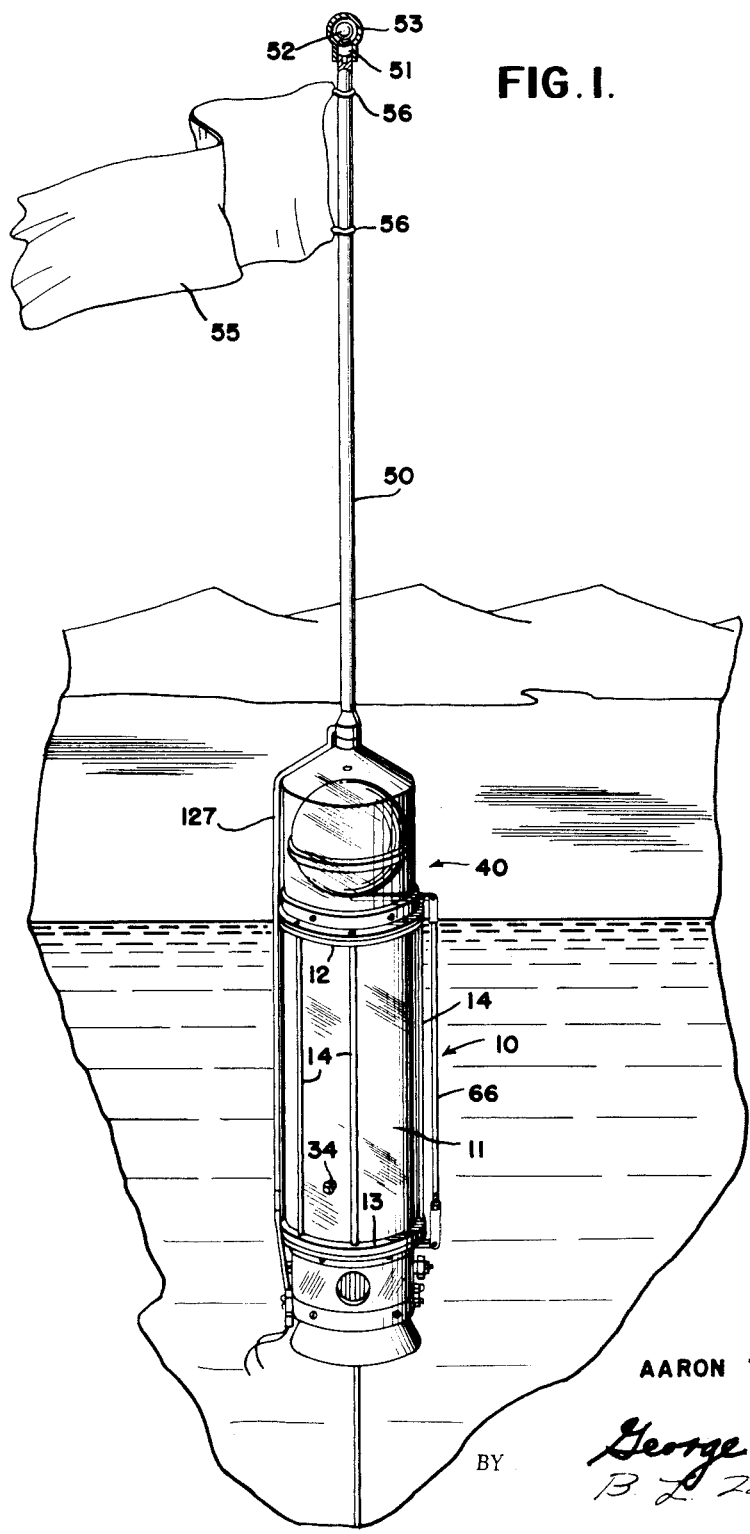
Fig. 1 is a perspective view of a buoy embodying certain features of the invention.
Figure 3:
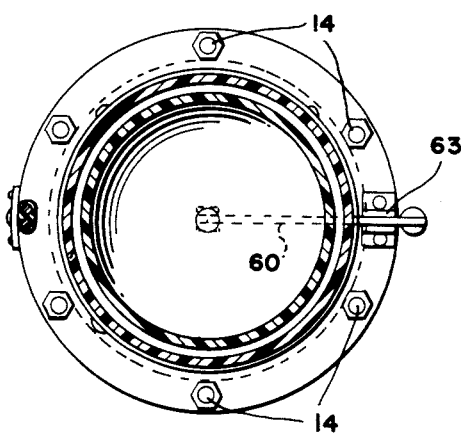
Fig. 3 is a horizontal section taken along line 3—3 of Fig. 2.
Figure 4:
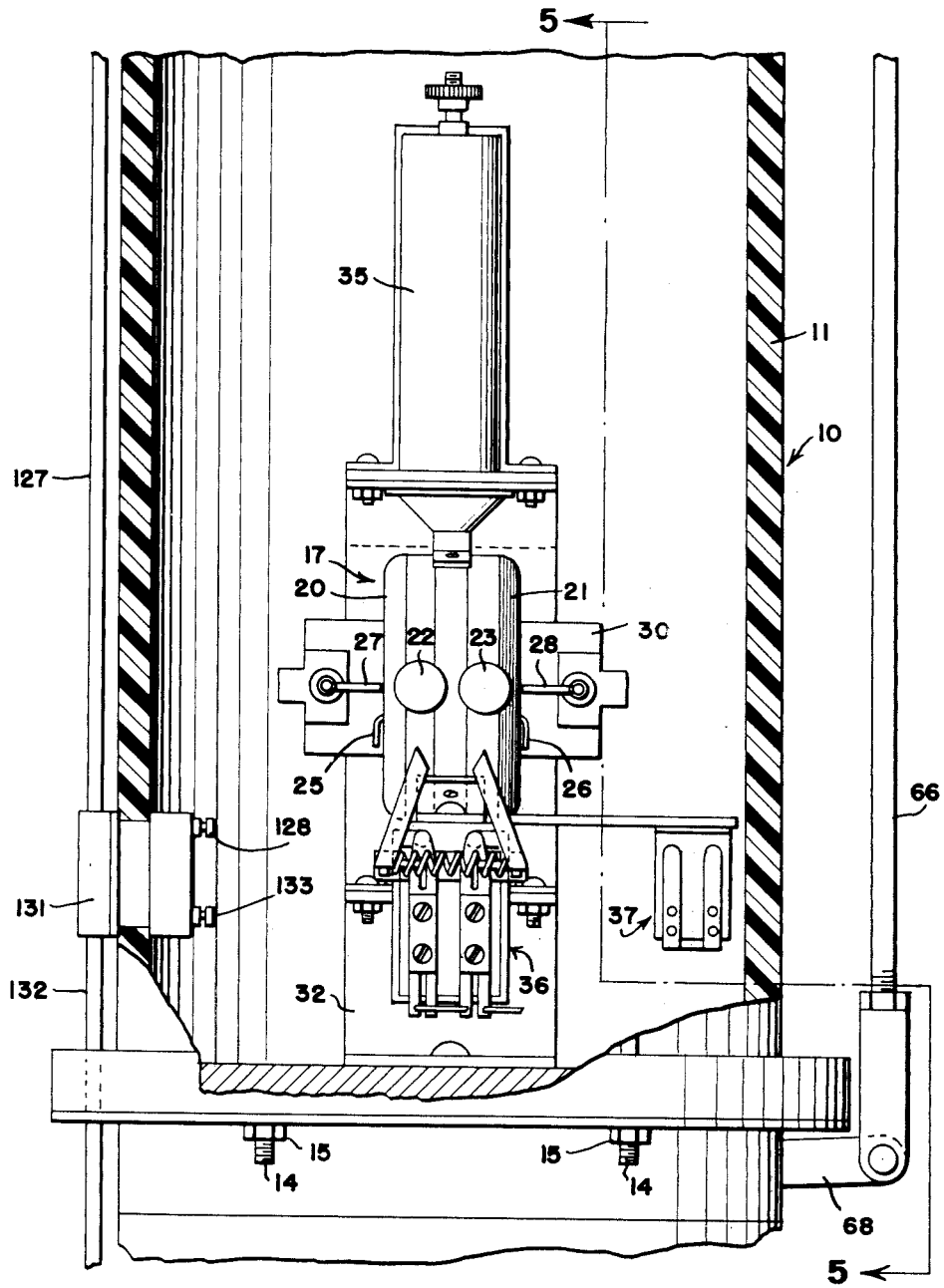
Fig. 4 is an enlarged fragmentary sectional view of an intermediate portion of the buoy shown in Fig. 1.

Referring now to the drawings, wherein like reference characters designate like or corresponding parts throughout the several views, there is shown in Fig. 1 a channel marking buoy maintained in a floating position in a body of water by an airtight chamber indicated generally at 10 which includes a tubular housing 11 clamped between an upper plate 12 and a lower plate 13 by tie rods 14—14 and nuts 15—15 (Figs. 3 and 4). The housing preferably is made of glass or transparent materials such as Lucite (methylmethacrylate), and suitable gaskets are used between the ends of the housing and the plates 12 and 13 so as to form a water tight joint.

Figure 5:
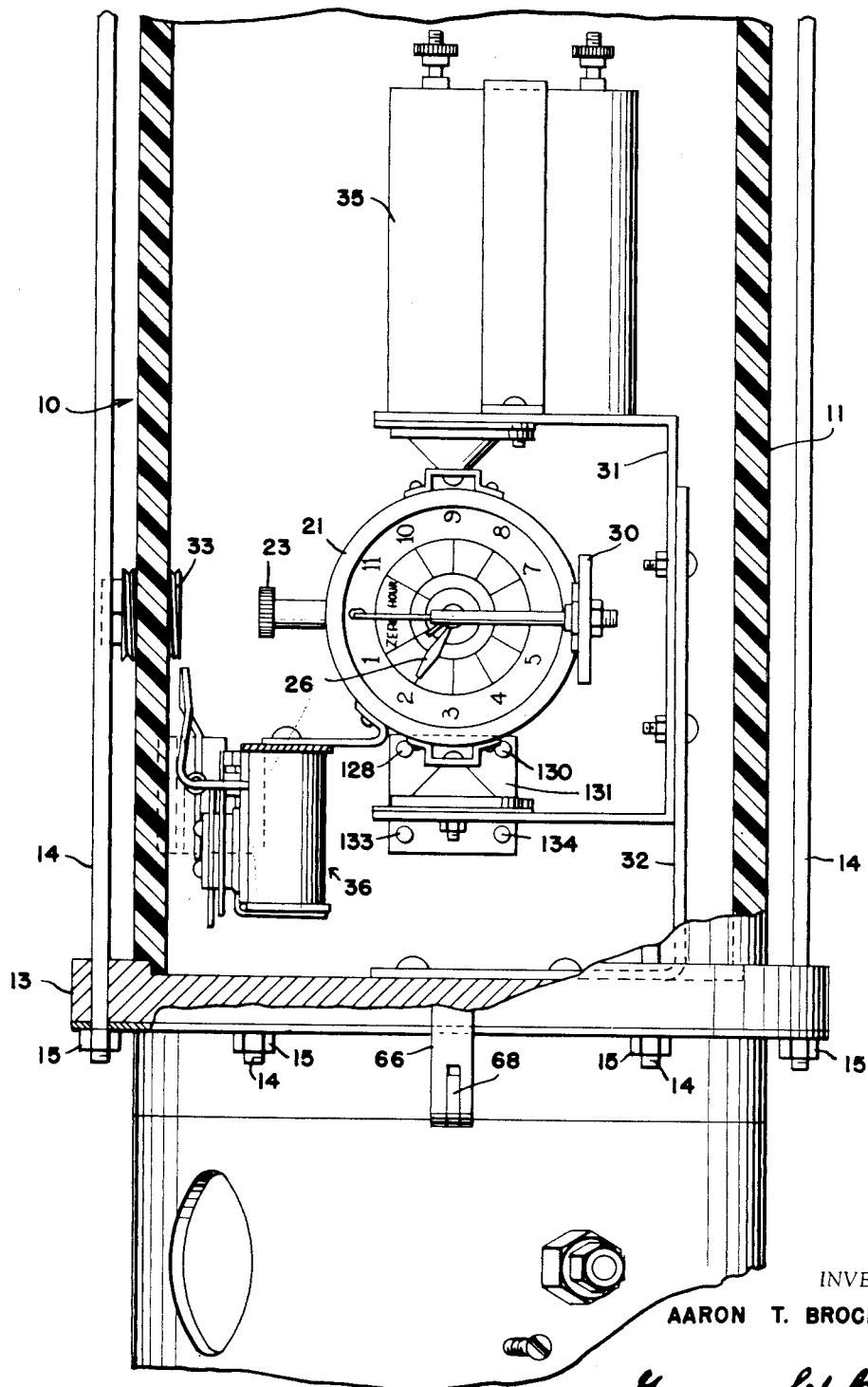
Fig. 5 is a vertical section taken along line 5—5 of Fig. 4.

A timing device indicated generally at 17 (Figs. 4 and 5) is positioned within the chamber 10, and includes a pair of clocks 20 and 21. The clocks 20 and 21 are identical in construction and operation and include spring actuated mechanism (not shown) arranged to be wound by thumb wheels 22 and 23, respectively. Hands 25 and 26 may be set manually opposite any desired indicia provided on the face of the clocks, and are arranged to engage contact arms 27 and 28, respectively, mounted on an insulated terminal strip 30 secured transversely to the clocks. When the hands 25 and 26 engage the respective contact 27 and 28, an electric circuit is completed therethrough. The clocks are mounted on a U-shaped bracket 31 secured to a support 32 fastened rigidly to the lower plate 13. Removable plugs 33 and 34 are provided to seal openings located in the housing 11 so that the clocks may be wound and set by means of suitable keys (not shown). A battery 35 and relays 36 and 37 are positioned in the chamber 10, and will be described in detail hereinbelow in connection with the wiring diagram shown in Fig. 8. The clocks 20 and 21 may be of any desired type, but I prefer clocks designed to operate in a manner similar to those known in the art as the "Dorson" clock manufactured by the Dorson Corporation, Chicago, Illinois, the "Zero Hour clocks" manufactured by the Zero Hour Electric Company, Tulsa, Oklahoma, or the "Marine Corps Model F-34 Time Delay" manufactured by the Day and Night Manufacturing Company, Monrovia, California.

Figure 2:
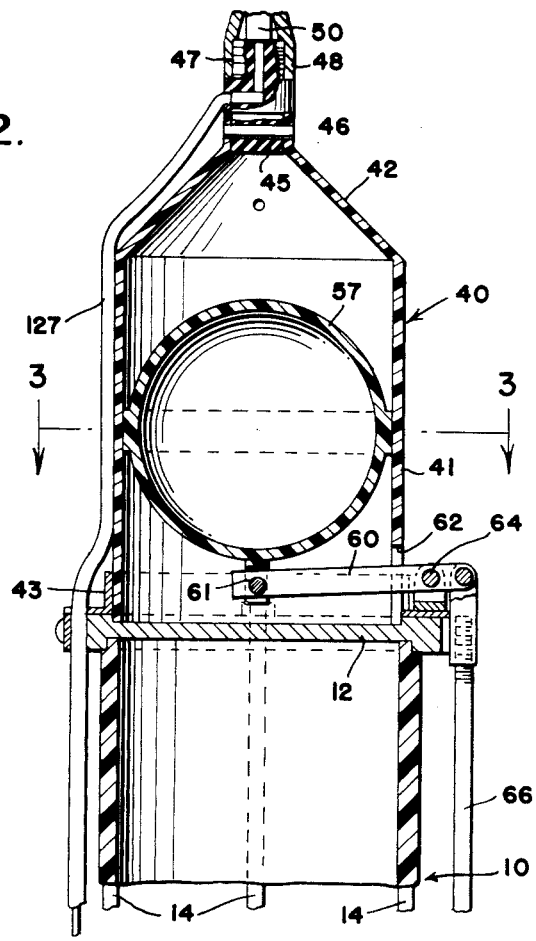
Fig. 2 is an enlarged fragmentary sectional view of the upper portion of the buoy shown in Fig. 1.
Figure 6:
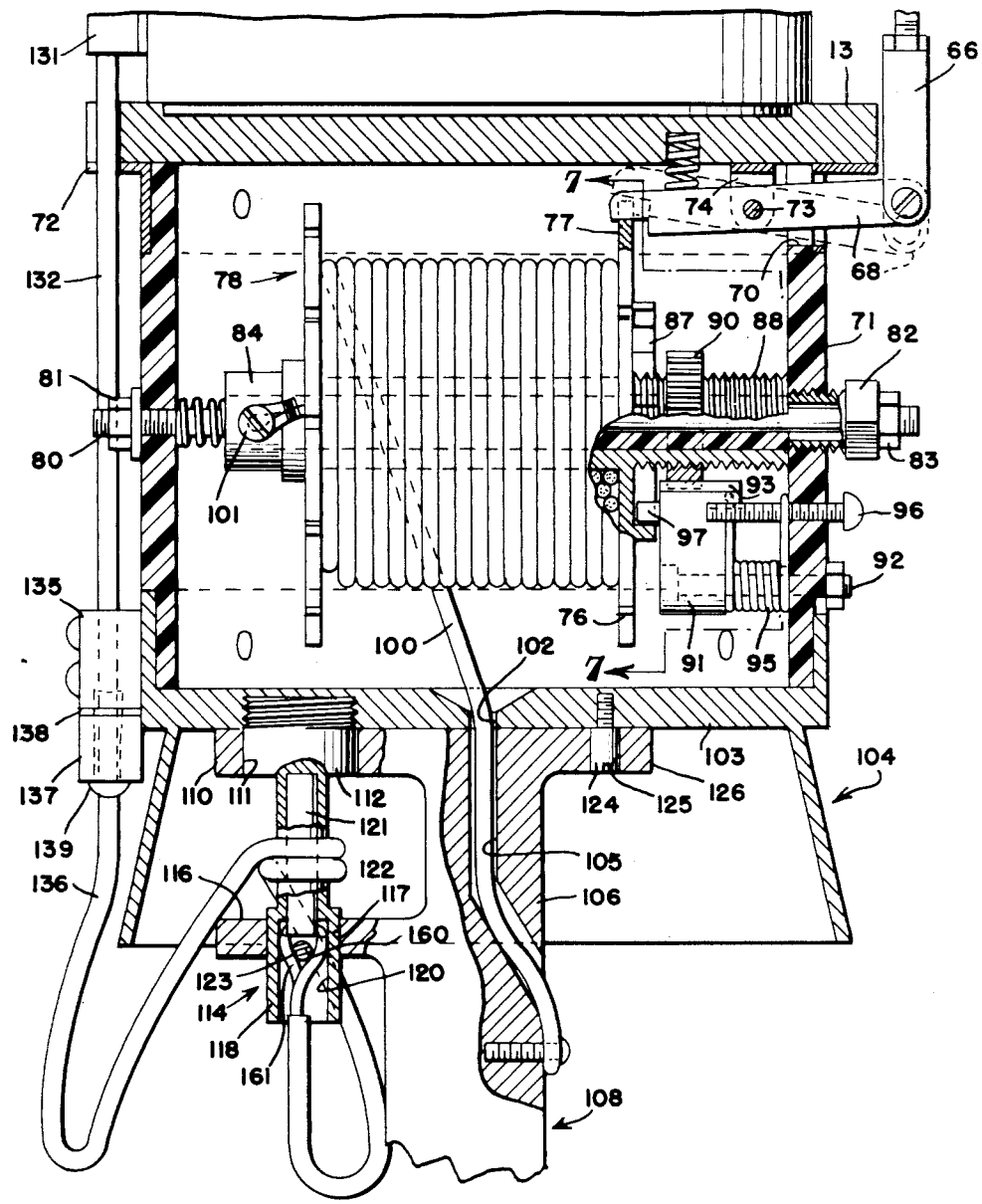
Fig. 6 is an enlarged fragmentary sectional view of the lower portion of the buoy shown in Fig. 1.

A float housing, indicated generally at 40 (Figs. 1 and 2), comprises of tubular cylindrical section 41 having a frusto-conical section 42 formed integrally therewith. The housing 40 is provided with an annular flange 43 so that it may be secured rigidly to the upper plate 12. A socket 45, made of electrical insulating material, is attached to the end of the frusto-conical section 42 by a pin 46, and has a threaded portion 47 designed to receive a nut 48 by means of which a tubular mast 50 is secured to the socket 45 and the chamber 40. A socket 51 is positioned in the upper end of the mast 50 to receive a lamp 52, and a transparent globe 53 is fitted over the end of the mast and the lamp so as to form a water tight joint between the globe and the mast. A length of electric cable having a pair of individually insulated conductors is positioned in the hollow mast 50, and has one end of each conductor connected to the terminals of the socket 51 and the opposite ends thereof connected to the terminals of a plug (not shown) provided in the lower end of the mast. When the mast 50 is secured to the socket by the nut 48, the plug in the lower end of the mast fits into the socket 45. The mast 50 has adjustable clamps 56—56 designed to hold a flag 55 on the upper end of the mast 50. A spherical float 57 (Fig. 2) positioned in the housing 40, is attached to one end of a lever 60 by a pin 61. The lever 60 extends through a slot 62 provided in the wall of the housing 40, and is mounted pivotally on a bracket 63 by a pin 64. The outer end of the lever 60 is connected to one end of a rod 66 which extends downwardly and has the lower end thereof connected to a locking bar 68 (Fig. 4). The bar 68 passes through an opening 70 provided in the wall of a cylindrical housing 71 secured to the underside of plate 13 by means of a flange 72. The bar 68 is mounted pivotally on a pin 73 carried by a bracket 74 secured to the plate 13 so that the free end thereof may engage any one of a plurality of slots 76—76 (Figs. 6 and 7) provided in the flange 77 of a reel indicated generally at 78.

Figure 7:
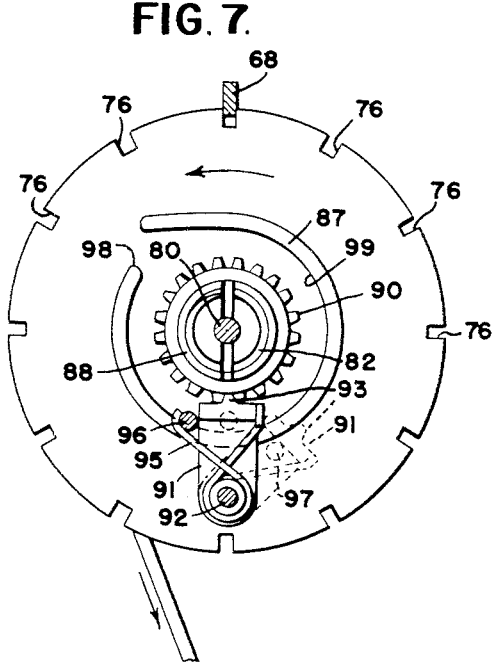
Fig. 7 is a vertical section taken along line 7—7 of Fig. 6.

The reel 78 (Fig. 6) is mounted rotatably on a shaft 80 secured diametrically across the walls of the housing 71 by a nut 81 fastened on one end thereof and a bushing 82 and a nut 83 fastened on the opposite end thereof. A hub 84 is provided on the left hand flange of the reel and a cam 87 and a threaded hub 88 is secured on the right hand flange 77. A toothed nut 90 is positioned on the threaded hub 88 and is free to travel on the hub between the cam 87 and the wall of the housing. A pawl 91 (Figs. 6 and 7), mounted rotatably on a post 92 has an elongated rib 93 arranged to engage the teeth of the nut 90. A torsion spring 95 is positioned over the pin 92 so as to normally urge the pawl 91 against a stop 96 (Fig. 7). The pawl 91 has a lug 97 designed to engage the outer periphery of the cam 87 when the pawl is in its dotted line position as shown in Fig. 7 and thereby hold the rib out of engagement with the nut. The cam 87 has a slot 98 to allow the lug 97 to pass into a central opening of the cam, whereby the spring 95 urges the pawl into engagement with the nut 90. The spring 95 holds the pawl against the nut with sufficient force to prevent the nut from rotating when the reel is rotated in a counterclockwise direction as viewed in Fig. 7, whereby the nut travels linearly along the threaded hub 88 until it engages the flange 77 of the reel. When the nut 90 reaches this position, the spring 95 then retards the rotation of the reel in a counterclockwise direction and prevents the rotation of the reel in this direction when no turning force is applied to the reel in a manner hereinafter to be described.

A length of steel cable 100 (Fig. 6) is wound on the reel and has the inner end thereof attached to the hub of the reel at 101. The outer end of the cable 100 passes through an aperture 102 in the top 103 of a hood 104 secured on the bottom of the housing 71, and through an aperture 105 provided in a shank 106 forming part of a conventional anchor, a portion of which is illustrated on the drawing and indicated generally at 108, and is attached to the shank 106 at 109. The anchor 108 also is provided with a lug 110 having a bore 111 designed to fit neatly over an enlarged head portion 112 of a cartridge holder, indicated generally at 114, mounted threadedly in the top 103 of the hood 104. A second lug 116 provided on the anchor directly beneath the lug 110 has a bore 117 designed to fit neatly over a lower body portion 118 of the holder 114. The holder 114 has a central bore 120 designed to receive a blasting cartridge 121, and an intermediate body portion 122 having a wall thickness capable of being fractured and blown apart by the cartridge 121. The anchor 108 is held on the holder 114 by a pin 123 passing through the lug 116 and through the body portion 118 of the cartridge holder. A pin 124 secured to the bottom 103 of the hood 104 slidably engages a bore 125 provided in a lug 126 provided on the anchor to prevent the anchor from turning about the holder 114.

The conductors of an insulated electric cable 127 (Figs. 2 and 4) connect the receptacle (not shown) provided in the socket 45 to conductive posts 128 and 130 provided in a terminal block 131 secured to the side of the housing 11. The conductors of an electric cable 132 connect a second pair of conductive posts 133 and 134 provided in the plug 131 to a receptacle 135 mounted on the lower end of the housing 71. A length of insulated electric cable 136 having one end thereof connected to a plug 137 designed to fit the receptacle 135, is wrapped around the holder 114 several times and has the opposite ends of its individually insulated conductors soldered to the terminals of the cartridge 121. A gasket 138 is placed between the plug and the receptacle, and the plug is secured to the receptacle by screws 139 so as to make a water tight joint between the plug and the receptacle.

Figure 8:
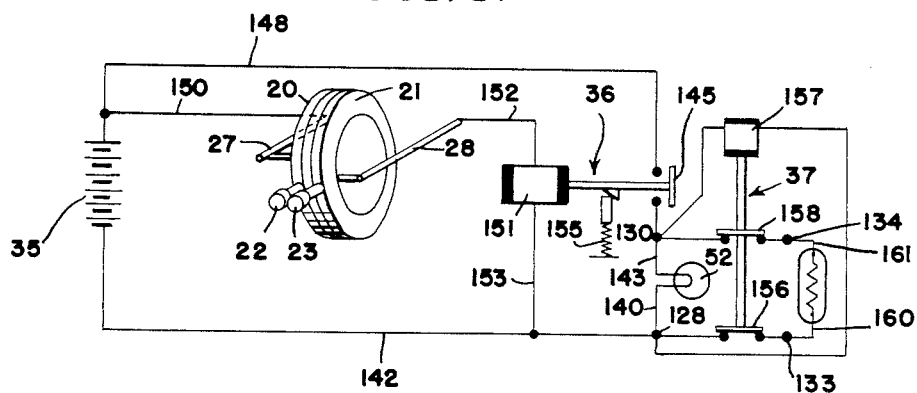
Fig. 8 is a schematic diagram of the electrical apparatus and associated control circuit for the buoy shown in Fig. 1.

Referring now to the wiring diagram shown in Fig. 8, it is to be assumed that the cable 127 comprises two individually insulated conductors 140 and 143. The conductor 140 connects one side of the mast light 52 directly to the post 128 of the terminal block 131, which in turn is connected directly to one terminal of the battery 35 by a wire 142. The conductor 143 of the cable 127 connects the other terminal of the mast light 52 to the post 130 of the block 131, which in turn is connected directly to one side of a normally open contact 145 of the relay 36 by a wire 146. The other side of the normally open contact 145 is connected to the other terminal of the battery 35 by a wire 148. A wire 150 also connects one terminal of the battery 35 to the contact arm 27, and a wire 152 connects the contact arm 28 to one side of an operating coil 151 of the relay 36. A wire 153 connects the opposite side of the coil 151 of the relay 36 to the battery 35. The relay 36 also is provided with a spring pressed mechanism indicated generally at 155 designed to hold the contact 145 in its closed position after being closed by energization of the coil 151. The contact 145 may be released from the mechanism 155 by passing a suitable tool through the opening sealed by the plug 33. The terminal 128 also is connected to one side of a normally closed contact 156 of the relay 37, and the terminal 130 also is connected to one side of a coil 157 and a normally closed contact 158 of the relay 37. The other side of the contacts 156 and 158 are connected to a second pair of studs 133 and 134, respectively, provided in the terminal blocks 131.

The other side of the coil 157 is connected to the post 128. The terminals 133 and 134 are connected to the terminals of the blasting cartridge 121, through the cable 132, the receptacle 135, the plug 137 and the individually insulated wires 160 and 161. The exposed ends of the wires 160 and 161 preferably are wrapped with suitable waterproof insulating material. The relay 37 preferably is provided with a mechanism (not shown) designed to retard the opening of the contacts 156 and 158 a predetermined period of time after its coil 157 is energized by the battery 35.

The above described device is designed to operate as a time delay channel marking buoy, that is, a channel marking buoy that sinks to the bottom of a body of water as soon as it is placed therein and automatically rises to the surface at the expiration of a predetermined period of time to mark a channel or an under water hazard. It is to be understood that the above described buoy is so designed that it also may be used as an instantaneous channel marking buoy.

At the beginning of the preparations necessary to place the buoy in condition to operate as a time delay channel marker, it is to be understood that the holder 114 does not contain a blasting cartridge 121, and that the plug 137 is disconnected from the receptacle 133. The mast 50 is attached to the socket 45 by the nut 48, and since the hands 25 and 26 of the clocks 20 and 21 normally engage the contact arms 27 and 28, respectively, the lamp 52 is energized by the battery 35 (Fig. 8) due to the fact that coil 151 of the relay 36 is energized by the battery and closes the contact 145. The plugs 33 and 34 are removed from the housing 11 (Figs. 4 and 5) and suitable keys are inserted through their respective openings to set the hands 25 and 26 so as to provide a predetermined time relay before the hands of the clocks 20 and 21 engage the arms 27 and 28 and to wind the clock springs. When the hands 25 and 26 are set to provide the proper time delay operation of the relay 36, they are disengaged from the contact arms 27 and 28, whereby the coil 151 of the relay 36 is deenergized. The latching mechanism 155 then is actuated to release the contact 145 to its normally open position and deenergize the lamp 52. The plugs 33 and 34 are replaced in their respective openings so as to render the chamber 10 airtight at these points.

The anchor 108 is positioned over the holder 114 and the pin 124, the blasting cartridge 121 is positioned in the bore 120 of the holder, and the pin 123 is passed through the lug 116 and the holder 114 to hold the anchor on the buoy and the cartridge in the bore 120. The reel 78 is turned until the cable 100 is substantially taut between the reel and the anchor, and positioned so that the lever 68 engages one of the slots 76 in the flange 77 of the reel and thereby locks the reel against rotation about the shaft 80. During this adjustment of the reel 78, the pawl 91 is positioned so that its lug 97 engages the outer periphery of the cam 87 with the opening 98 of the cam located a predetermined angular distance away from the lug which cannot exceed 360°, or the equivalent of one revolution of the reel in clockwise direction. In this position the rib 93 is disengaged from the nut 90, and the nut then is positioned on the hub 88 a distance from the flange 77 having a definite relationship to the depth of the body of water in which the buoy is to operate. It is to be understood that the thread on the hub 88 has a pitch designed to feed the nut toward the flange 77 a predetermined linear distance for each complete revolution of the reel 78 and that the nut is positioned on the hub so that it will engage the flange 77 before the reel pays out a length of cable sufficient to let the buoy reach the surface of the water. After these adjustments are made the buoy then is transported to a body of water in which a channel is to be marked. The plug 137 is inserted in the receptacle 135 and secured thereto by the screws 139 so that moisture or water cannot enter the joint between the plug and the receptacle, and the buoy then is dropped into the water. The anchor 108 is of sufficient weight to submerge the air tight chamber 10 until the anchor rests on the bottom of the body of water in an upright position. Water enters the float housing 40 through the slot 62 and urges the float 57 upwardly as the air in the housing escapes through the vent provided therein and shown in Figs. 1 and 2. This movement of the float pivots the arm 60 about the pin 64 in a clockwise direction and moves the rod 66 downwardly. The rod 66 in turn moves the arm about the pin 73 so as to disengage the end of the arm from the slot 76 of the flange 77 in which it was positioned when the buoy was dropped into the water. The reel 78 now is free to rotate, but does not do so because there is no pull on the cable 100 by the anchor 108 due to the fact that the anchor is attached to the buoy by the pin 123.

When the period of time set on the clocks 20 and 21 has elapsed, the hands 25 and 26 engage the contacts arms 27 and 28, respectively, and thereby connect the coil 151 directly across the battery 55. The energization of the coil 151 closes the contact 145 which in turn connects the lamp 52 and the cartridge 121 across the battery. As a result, the lamp 52 is energized and the cartridge 121 explodes with sufficient force to tear the holder apart and thereby release the buoy from the anchor. The buoyant chamber 10 starts upwardly toward the surface and the resulting pull on the anchor cable 100 rotates the reel 78. For a predetermined portion of the first revolution of the reel, the cam 87 holds the pawl out of engagement with the nut 90, whereby the nut rotates with the reel. This initial position of the cam and pawl permits the buoyant chamber 10 get started away from the anchor 100 without having to overcome the friction involved in turning the hub 88 in the nut 90. After the reel makes one revolution, the lug 97 has passed through the opening 98 of the cam 87 and allows the rib 93 of the pawl to engage the teeth of the nut 90. When this occurs, the pawl holds the nut against rotation as the cable 100 is withdrawn from the reel by the upward movement of the buoy, whereupon the nut travels linearly along the hub toward the flange 77 of the reel. When the buoy has traveled a predetermined distance from the bottom of the body of water, the nut 90 abuts the flange 77, with the result that the action of the spring 95 on the pawl 91 retards the rotation of the reel. This arrangement of the pawl, the nut and the spring causes the buoy to continue to rise toward the surface at a substantially slower rate of speed, thereby preventing the reel from overrunning and paying out excess cable when the buoy reaches the surface, which would permit the buoy to float out of vertical alignment with the anchor.

The buoy is designed to stop its upward movement and float in the water so that the float housing 40 is positioned above the surface of the water. When the float housing 40 rises above the surface, the water therein flows out of the housing through the slot 62 and allows the float 57 to fall to its lowermost position. This movement of the float raises the rod 66 and causes the end of the arm 68 to engage the periphery of the flange 77 of the reel 78. The natural rise and fall of the surface of the water causes the surfaced buoy to pull the cable off the reel a notch at a time against the action of the pawl and the nut 90 until the end of the arm 168 falls into one of the slots 77 of the reel, and thereby locks the reel against further rotation. As a result, the anchor holds the buoy in its proper location in the body of water, and the flag 57 and the lighted lamp 52 provide visual identification of the channel point marked by the buoy.

The buoy continues to float on the surface of the water in this manner until the depth of the body of water increases due to flood tide or other changes in the initial conditions existing at the time the buoy floated to the surface. As a result, the housing 40 becomes partially submerged because the reel 78 is locked by the bar 68 against rotation and cannot pay out to suit the increase in the depth of the water. Water enters the housing 40 and raises the float which in turn urges the rod 66 downwardly and lifts the bar 68 out of the slot 76 in the flange 77 in which it was positioned. This movement of the bar 68 allows the reel to rotate, and since the buoy is submerged below its normal floating position, it moves upwardly and withdraws cable from the reel, a notch at a time as determined by the nut 90 and the pawl 91. When the float housing 40 is properly positioned above the surface of the water, the water drains therefrom and allows the float to assume its lowermost position, in which position it causes the bar to lock the reel against further rotation. Thus, any increase in the depth of the water due to changes in the tide or adverse weather conditions, does not affect the operation of the buoy.

It is believed to be apparent that a plurality of buoys like described hereinabove may be submerged at preselected points in a body of water at approximately the same time, and that after a predetermined period of time as determined by the timing clocks 20 and 21 provided in the buoys all the buoys will surface and thereby mark a navigable channel in said body of water.

The above described buoy also may be used as an instantaneous channel marking buoy by setting the hands 25 and 26 of the clocks 20 and 21, so that they engage the contact arms 27 and 28, respectively, and energize the coil 151 of the relay 36. The coil 151 closes the contact which in turn energizes the lamp 52. The blasting cartridge 121, the pin 123 and the cable 135 are not assembled on the buoy when it is to be used as an instantaneous buoy. When such a buoy is placed in a body of water, the chamber 10 floats on the surface of the water while the anchor falls to the bottom of the water. The nut 90, the pawl 91 and the spring 95 act in the manner described to prevent the reel 78 from overrunning when the anchor strikes the bottom. The float 57 operates in the housing 41 in the described manner so as to allow the reel to pay out additional cable when the depth of the water increases for any reason. Thus, the above described buoy also may be used as in instantaneous channel marking device.

It is to be understood that the above described arrangements are simply illustrative of the application of the principles of the invention. Numerous other arrangements may be readily devised by those skilled in the art which will fall within the spirit and scope of the invention.

For example, the above described device may be readily modified in the light of the above teaching to operate in conjunction with under water mines and various underwater demolition devices.

What is claimed is:

1. A buoy for marking a predetermined point in a body of water, which comprises an elongated body member including a buoyant section and a weighted section, said body member having a total weight greater than its cubic deplacement so that it submerges to the bottom of a body of water in which the buoy is to be used, electrical detonating means provided in said body member, time responsive means provided in the body member for actuating said electrical detonating means for releasing the buoyant section from the weighted section of the body member after the body member chamber is submerged a predetermined period of time, and means secured on the buoyant section of the body member for visually indicating the position of the weighted section in the body of water.

2. A buoy for marking a channel in a body of water, which comprises a buoyant chamber, means attached releasably to the chamber and having sufficient weight to submerge the chamber in the body of water in which the buoy is to be used, an explosive charge having an electrically energized circuit provided on said chamber, a plurality of time responsive means provided in the chamber for closing said circuit for releasing the chamber from the submerging means so that the chamber may float to the surface of the water at the expiration of a predetermined period of time, and extensible means provided on the chamber for holding the chamber in a floating position relative to said submerging means.

3. A buoy for marking a channel in a body of water, which comprises a buoyant chamber, means attached releasably to the chamber having sufficient weight to submerge the chamber in said body of water, an explosive charge having an electrically energized circuit and associated with said chamber, time responsive means provided in the chamber for closing said circuit for releasing the chamber from the submerging means so that the chamber may float to the surface of the water after being submerged a period of time, extensible means for holding the chamber in a normal floating position to said submerging means, means for locking the extensible means automatically when the buoyant chamber reaches the surface of the water so as to hold the chamber in substantial vertical alignment with the submerging means, and means for rendering the locking means inoperative when the depth of said body of water increases a predetermined amount after the chamber reaches the surface so that the extensible means allows the chamber to assume its normal floating position.

4. A delayed action device for marking a preselected position in a body of water, which comprises a buoyant chamber, an anchor attached releasably to the chamber and having sufficient weight to hold the chamber on the bottom of such a body of water, means including an adjustable timing device positioned in the chamber for releasing the chamber from the anchor at the expiration of a predetermined period of time so that the buoyant chamber may rise to the surface of the water, a reel attached rotatably to the lower end of the chamber and having a length of cable wound thereon and attached to the anchor so that the anchor withdraws the cable from the reel as chamber rises to the surface and thereby holds the chamber in its proper floating position with respect to the position marked by the anchor, means for braking the rotation of the reel after the chamber has travelled a predetermined distance above the anchor to prevent overrunning of the reel when the chamber reaches the surface, and means provided on the reel for rendering the braking means inoperative for a predetermined portion of the travel of the chamber immediately after it is released from the anchor.

5. A delayed action device for marking a preselected position in a body of water, which comprises, a buoyant chamber, an anchor attached releasably to the chamber and having sufficient weight to hold the chamber on the bottom of such a body of water, means including an adjustable timing device positioned in the chamber for releasing the chamber from the anchor at the expiration of a predetermined period of time so that the buoyant chamber may rise to the surface of the water, a reel supported rotatably on the lower end of the chamber and having a length of cable wound thereon and attached to the anchor so that the anchor withdraws the cable from the reel as the chamber rises to the surface and thereby secures the chamber in a floating position to the anchor, means provided on the chamber for automatically locking the reel against rotation when the chamber reaches its normal floating position on the surface of the water to prevent the chamber from floating out of alignment with the anchor, said locking means being designed to automatically release the reel when the depth of the water increases a predetermined amount after the chamber is locked to the anchor in its normal floating position so that the chamber is free to withdraw an additional amount of cable from the reel and assume its normal floating position on the surface of the water, means for braking the rotation of the reel after the chamber has travelled a predetermined distance above the anchor to prevent overrunning of the reel when the chamber reaches its normal floating position on the surface of the water, and means provided on the reel rendering the braking means inoperative for a predetermined portion of the travel of chamber after it is released from the anchor.

6. A delayed action device for marking a preselected position in a body of water, which comprises, a buoyant chamber, an anchor attached releasably to the chamber and having sufficient weight to hold the chamber on the bottom of such a body of water, means including an adjustable timing device positioned in the chamber for releasing the chamber from the anchor at the expiration of a predetermined period of time so that the buoyant chamber may rise to the surface of the water, a reel supported rotatably on the lower end of the chamber and having a length of cable wound thereon, and attached to the anchor so that the anchor withdraws the cable from the reel as chamber rises to the surface, a housing mounted on the upper end of the chamber and having an opening in the lower portion thereof and a vent opening in the upper portion thereof, a float positioned in the housing and movable between a lowermost position and an uppermost position, and means operable by the float for locking the reel against rotation when it is in its lowermost position and for releasing the reel for rotation when it is in its uppermost position, whereby when the housing is submerged and filled with water the reel is free to rotate and allow the chamber to rise to the surface when the chamber is released from the anchor and when the housing rises above the surface the water empties therefrom and permits the float to assume its lowermost position and lock the reel against further rotation.

References Cited in the file of this patent

UNITED STATES PATENTS

| | | |
|---|---|---|
| 524,243 | Bulette | Aug. 7, 1894 |
| 606,517 | Cubbedge | June 28, 1898 |
| 637,147 | Moriarty | Nov. 14, 1899 |
| 1,249,486 | Polachek | Dec. 11, 1917 |
| 1,416,336 | Czeperko | May 16, 1922 |
| 2,397,995 | Wikstrom | Apr. 9, 1946 |
| 2,586,828 | Keeran | Feb. 26, 1952 |